(12) United States Patent
Bourdelais et al.

(10) Patent No.: US 7,199,322 B2
(45) Date of Patent: Apr. 3, 2007

(54) VARIABLE SPACER DOTS FOR TOUCH SCREEN

(75) Inventors: Robert P. Bourdelais, Pittsford, NY (US); Cheryl J. Brickey, Webster, NY (US); Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 157 days.

(21) Appl. No.: 10/988,340

(22) Filed: Nov. 12, 2004

(65) Prior Publication Data

US 2006/0102462 A1    May 18, 2006

(51) Int. Cl.
*H01H 1/10* (2006.01)

(52) U.S. Cl. .................. 200/512; 200/600; 345/173; 29/662

(58) Field of Classification Search ........... 200/5 A, 200/600, 511–512, 514; 29/622; 345/168, 345/173, 174
See application file for complete search history.

(56) References Cited

U.S. PATENT DOCUMENTS

| | | | |
|---|---|---|---|
| 4,220,815 | A | 9/1980 | Gibson et al. |
| 5,062,198 | A | 11/1991 | Sun |
| 2002/0094660 | A1 | 7/2002 | Getz et al. |
| 2003/0141118 | A1 | 7/2003 | Kakuno |
| 2004/0090426 | A1 | 5/2004 | Bourdelais et al. |
| 2004/0135775 | A1 | 7/2004 | Hurst et al. |
| 2006/0102452 | A1 | 5/2006 | Cok et al. |
| 2006/0102460 | A1 | 5/2006 | Bourdelais et al. |
| 2006/0102461 | A1 | 5/2006 | Cok et al. |
| 2006/0102463 | A1 | 5/2006 | Cok |
| 2006/0103632 | A1 | 5/2006 | Bourdelais et al. |
| 2006/0105146 | A1 | 5/2006 | Bourdelais et al. |
| 2006/0105148 | A1 | 5/2006 | Cok et al. |
| 2006/0105152 | A1 | 5/2006 | Cok et al. |

FOREIGN PATENT DOCUMENTS

EP    1 471 415    10/2004

*Primary Examiner*—K. Lee
(74) *Attorney, Agent, or Firm*—Andrew J. Anderson

(57) ABSTRACT

A touch screen comprising: a) a substrate; b) a first conductive layer located on the substrate; c) a flexible sheet comprising a substantially planar surface and integral compressible spacer dots formed thereon, each integral compressible spacer dot having a base closest to the substantially planar surface and a peak furthest from the substantially planar surface; and d) a second conductive layer located on the substantially planar surface of the flexible sheet, the peaks of the integral compressible spacer dots extending beyond the second conductive layer located on the substantially planar surface; wherein the first and second conductive layers are positioned towards each other and separated by the integral compressible spacer dots. The integral compressible spacer dots are sized and positioned in a pattern that establishes at least one of differentiated minimum required activation forces and differentiated durability for selected areas of the touch screen.

40 Claims, 8 Drawing Sheets

VARIABLE SPACER DOTS FOR TOUCH SCREEN

FIELD OF THE INVENTION

This invention relates to resistive touch screens and more particularly, to a flexible cover sheet and spacer dots separating the cover sheet from a substrate in a resistive touch screen.

BACKGROUND OF THE INVENTION

Resistive touch screens are widely used in conventional CRTs and in flat-panel display devices in computers and in particular with portable computers.

FIG. 3 shows a portion of a prior art resistive touch screen 10 of the type shown in Published US Patent Application No. 2002/0094660A1, filed by Getz et al., Sep. 17, 2001, and published Jul. 18, 2002, which includes a substrate 12, having a first conductive layer 14. A flexible cover sheet 16 includes a second conductive layer 18 that is physically separated from the first conductive layer 14 by spacer dots 20 formed on the second conductive layer 18 by screen printing.

Referring to FIG. 4, when the flexible cover sheet 16 is deformed, for example by finger 13 pressure, to cause the first and second conductive layers to come into electrical contact, a voltage applied across the conductive layers 14 and 18 results in a flow of current proportional to the location of the contact. The conductive layers 14 and 18 have a resistance selected to optimize power usage and position sensing accuracy. The magnitude of this current is measured through connectors (not shown) connected to metal conductive patterns (not shown) formed on the edges of conductive layers 18 and 14 to locate the position of the deforming object.

Alternatively, it is known to form the spacer dots 20 for example by spraying through a mask or pneumatically sputtering small diameter transparent glass or polymer particles, as described in U.S. Pat. No. 5,062,198 issued to Sun, Nov. 5, 1991. The transparent glass or polymer particles are typically 45 microns in diameter or less and mixed with a transparent polymer adhesive in a volatile solvent before application. This process is relatively complex and expensive and the use of an additional material such as an adhesive can be expected to diminish the clarity of the touch screen. Such prior art spacer dots are limited in materials selections to polymers that can be manufactured into small beads or UV coated from monomers.

It is also known to use photolithography to form the spacer dots 20. In these prior art methods, the spacer dots may come loose and move around within the device, thereby causing unintended or inconsistent actuations. Furthermore, contact between the conductive layers 14 and 18 is not possible where the spacer dots are located, thereby reducing the accuracy of the touch screen, and stress at the locations of the spacer dots can cause device failure after a number of actuations. Unless steps are taken to adjust the index of refraction of the spacer dots, they can also be visible to a user, thereby reducing the quality of a display located behind the touch screen.

U.S. Pat. No. 4,220,815 (Gibson et al.) and US Patent Application US20040090426 (Bourdelais et al.) disclose integral spacer dots on flexible cover sheets for touch screen applications. It would be desirable to improve such integral spacer dot systems for separating the conductive layers of a touch screen in order to improve the robustness of the touch screen and reduce the cost of manufacture. It would be further desirable to provide integral spacer dots across the touch screen that improve usability of the touch screen for various applications.

SUMMARY OF THE INVENTION

In one embodiment, the invention is directed towards a touch screen comprising: a) a substrate; b) a first conductive layer located on the substrate; c) a flexible sheet comprising a substantially planar surface and integral compressible spacer dots formed thereon, each integral compressible spacer dot having a base closest to the substantially planar surface and a peak furthest from the substantially planar surface; and d) a second conductive layer located on the substantially planar surface of the flexible sheet, the peaks of the integral compressible spacer dots extending beyond the second conductive layer located on the substantially planar surface; wherein the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers, and further wherein the integral compressible spacer dots are sized and positioned in a pattern that establishes at least one of differentiated minimum required activation forces and differentiated durability for selected areas of the touch screen.

In a further embodiment, the invention is directed towards a method of making a resistive touch screen, comprising the steps of: a) providing a substrate; b) forming a first conductive layer on the substrate; c) providing a flexible cover sheet comprising a substantially planar surface and integral compressible spacer dots formed thereon, each integral compressible spacer dot having a base closest to the substantially planar surface and a peak furthest from the substantially planar surface; d) a second conductive layer located the flexible sheet, the peaks of the integral compressible spacer dots; d) forming a second conductive layer on the substantially planar surface of the flexible cover sheet, where the peaks of the integral compressible spacer dots extend beyond the second conductive layer formed on the substantially planar surface; and e) locating the flexible cover sheet over the substrate such the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers, wherein the integral compressible spacer dots are sized and positioned in a pattern that establishes at least one of differentiated minimum required activation forces and differentiated durability for selected areas of the touch screen.

ADVANTAGES

The touch screen of the present invention has the advantages that it is simple to manufacture, and provides greater accuracy, robustness, clarity, and versatility.

DETAILED DESCRIPTION OF THE INVENTION

Figure 1:
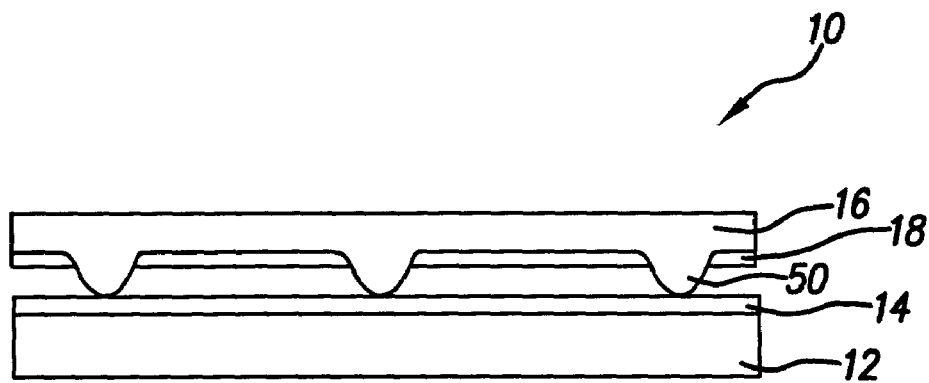
FIG. 1 is a schematic diagram showing a portion of a touch screen according to the present invention.

Referring to FIG. 1, the problems of the prior art resistive touch screens are overcome through the use of a flexible cover sheet 16 having a second conductive layer 18 and integral compressible spacer dots 50 formed in the flexible cover sheet 16, where the flexible cover sheet 16 is located over a substrate 12 having a first conductive layer 14. Flexible cover sheet 16 comprises a substantially planar surface and the integral compressible spacer dots 50 are formed thereon, each integral compressible spacer dot having a base closest to the substantially planar surface and a peak furthest from the substantially planar surface. Second conductive layer 18 is deposited over the flexible cover sheet 16 between the spacer dots 50, and preferably does not cover the peaks of the spacer dots 50. Alternatively, if conductive material from layer 18 is formed on the peaks of the dots 50, it may be electrically isolated from the conductive layer 18 formed on the substantially planar surface portion of flexible sheet 16. When a force is applied to the flexible cover sheet 16 at the location of one of the integral compressible spacer dots 50, the integral compressible spacer dot is compressed to allow electrical contact between the first and second conductive layers. The word "integral" means that the compressible spacer dots 50 are formed in and comprise the same material as the flexible cover sheet 16 for example by molding or embossing. In FIG. 1, the spacer dots are shown as equal shape and spacing, but may vary according to the invention.

In the absence of an applied compressive force, the peaks of the integral compressible spacer dots 50 extend beyond the second conductive layer 18 located on the substantially planar surface area of the flexible cover sheet 16, and prevent the second conductive layer on the substantially planar surface from touching the first conductive layer 14 on the substrate 12. Because the peaks of integral compressible spacer dots 50 are not coated with the second conductive layer 18 (or conductive material coated on such peaks is not in electrical contact with the second conductive layer 18 deposited on the substantially planar surface between the spacer dots), and because the integral compressible spacer dots 50 physically separate the conductive layer 18 deposited on the substantially planar surface from conductive layer 14, no current can flow between the conductive layers. While the various layers of the touch screen may be transparent or not for different applications, in a preferred embodiment each of the substrate, first conductive layer, flexible cover sheet, and second conductive layer are transparent to allow use in combination with displays or area illuminators (lamps).

Figure 2:
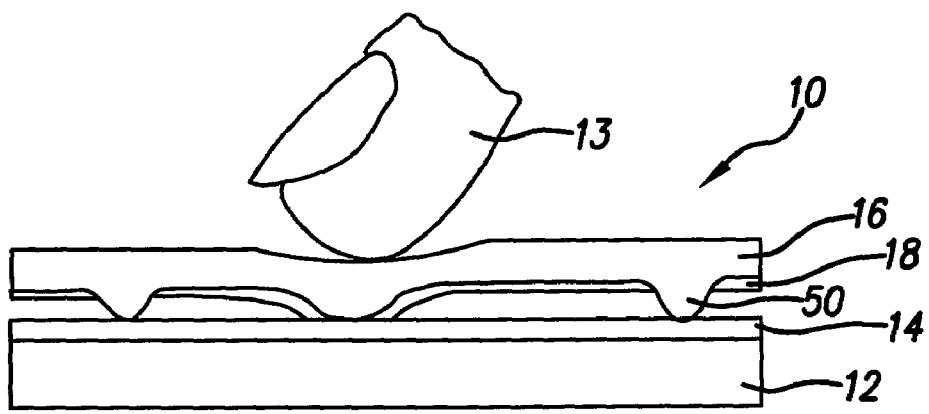
FIG. 2 is a schematic diagram illustrating the operation of the touch screen shown in FIG. 1.
Figure 3:
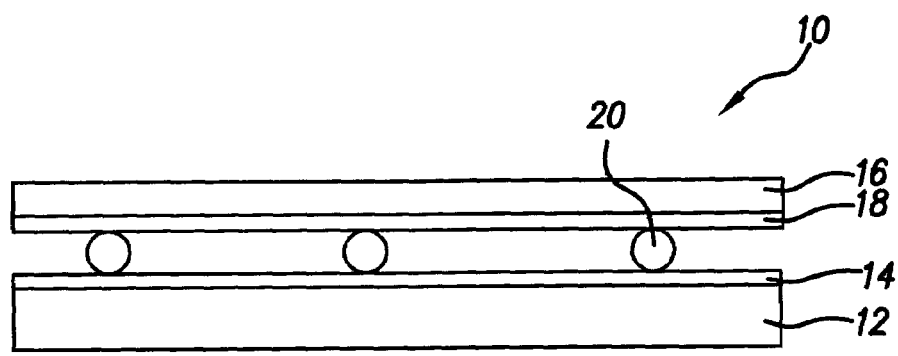
FIG. 3 is a schematic diagram showing a portion of a prior art touch screen.
Figure 4:
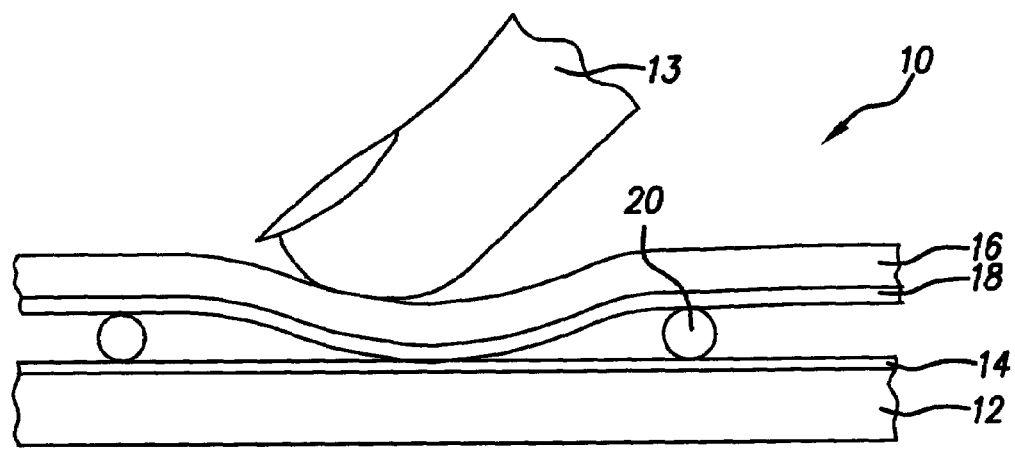
FIG. 4 is a schematic diagram illustrating the operation of the touch screen of FIG. 3.

Referring to FIG. 2, in operation, when an external object such as a finger 13 or stylus deforms the flexible cover sheet 16, the flexible cover sheet 16 is pressed against the substrate 12 thereby causing the conductive layers 14 and 18 to touch and close a circuit. Substrate 12 itself may be rigid or flexible. If the substrate is flexible, however, it should be less flexible than the cover sheet, or mounted upon a surface that is less flexible than the cover sheet. If the deformation occurs on one of the integral compressible spacer dots 50, the spacer dot is compressed so that contact is made between conductive layers 14 and 18 and current can flow between the conductive layers. Since the stylus or finger 13 is typically larger than the integral compressible spacer dot 50, the lack of conductive material 18 at the top of the integral compressible spacer dots 50 does not inhibit the conductive layers 14 and 18 from touching. If the deformation does not occur on one of the integral compressible spacer dots 50, the contact is made between conductive layers 14 and 18 without necessarily compressing a spacer dot.

Because the integral compressible spacer dots 50 are an integral part of the flexible cover sheet 16, they are fixed in position and cannot move or come loose as can spacer dots composed of beads in an adhesive matrix, or dots that are formed by printing or photolithography. In particular, in the case of use of a flexible substrate 12, as the substrate 12 is flexed, the integral spacer dots 50 are not likely to be broken loose from the flexible cover sheet 16. Moreover, the integral spacer dots can be smaller than conventional spacer dots (e.g. as small as 1 micron in diameter, usually 10 to 50 microns). Additional materials, such as adhesives, are unnecessary, thereby reducing manufacturing materials and steps and further improving the optical clarity of the device. Indeed, because the integral compressible spacer dots 50 are integral to the flexible cover sheet 16, as a flexible substrate 12 and flexible cover 16 are flexed, the integral compressible spacer dots 50 are flexed with them, thus maintaining the separation between the substrate 12 and cover sheet 16. The number of integral compressible spacer dots 50 may be increased to further enhance the robustness of the touch screen.

There are at least two methods for creating the compressible spacer dots integral to the flexible cover sheet. The first is to take an existing, formed flexible cover sheet with no spacer dots and emboss spacer dots in the flexible cover sheet by applying heat and pressure to the flexible cover sheet in a mold that defines a reverse image of the spacer dots. The heat and pressure reforms the flexible cover sheet so that the flexible cover sheet will have integral compressible spacer dots when the mold is removed. Such a mold can be, for example, a cylinder that rolls over a continuous sheet of flexible cover sheet material.

In a second method, melted polymer may be coated over the mold and forced into the cavities (for example by injection roll molding), allowed to cool, and then lifted from the mold. The mold may be provided with the cavities through conventional means, for example machining, bead blasting or etching.

With either method, a great variety of spacer dot shapes are possible, for example, cylinders, cubes, spheres, hemispheres, cones and pyramids. The spacer dot shape is dependent on a number of considerations, for example, the method used for manufacturing, the size of the object used to deform the cover sheet, the size of the dots, the flexible cover sheet material, and the number of activations of the device over its useable lifetime.

In one embodiment of the invention, the touch screen employs integral compressible spacer dots that have a flat-topped circularly cylindrical shape. A circular cylinder provides for specular light transmission and has impact resistance. Further, the ends of the cylinders can provide excellent optical contact with the substrate. The diameter and height of the cylinders can be adjusted to provide the desired compression profile. As used herein compression profile means the ability of the spacer dots to undergo the desired compression and expansion.

In another embodiment of the invention, the touch screen employs integral compressible spacer dots that are hemisphere-shaped. The hemisphere provides a precision gap as well as high light transmission. The hemisphere also provides excellent compression and fatigue characteristics. In another embodiment of the invention, the touch screens may employ integral compressible spacer dots that are cylinder-shaped having rectangular cross sections. A rectangular compressible spacer dot (for example a cube) provides impact resistance as well as a precision optical spacing. In another embodiment, the touch screen may employ integral compressible spacer dot that comprise a pyramid shape, which may have a flat top. A pyramid provides a precision optical gap as well as some light directing. A 45-degree pyramid in air will tend to focus transmitted light into a line perpendicular to the base of the pyramid providing both optical spacing as well as light directing. Further, the pyramid and hemisphere shapes provide a more rapidly changing compression gradient as the shape is compressed.

The flexible cover sheet having the integral compressible spacer dots is preferably constructed from a polymer. In certain embodiments, a transparent flexible cover sheet may be desired, particularly in combination with touch screen devices comprising transparent substrates. A transparent polymeric material may provide high light transmission properties, is inexpensive and a sheet of polymeric material can easily be formed with integral compressible spacer dots. Suitable polymer materials include polyolefins, polyesters, polyamides, polycarbonates, cellulosic esters, polystyrene, polyvinyl resins, polysulfonamides, polyethers, polyimides, polyvinylidene fluoride, polyurethanes, polyphenylene-sulfides, polytetrafluoroethylene, polyacetals, polysulfonates, polyester ionomers, and polyolefin ionomers. Polycarbonate polymers have high light transmission and strength properties. Copolymers and/or mixtures of these polymers can be used.

Polyolefins particularly polypropylene, polyethylene, polymethylpentene, and mixtures thereof are suitable. Polyolefin copolymers, including copolymers of propylene and ethylene such as hexene, butene and octene can also be used. Polyolefin polymers are suitable because they are low in cost and have good strength and surface properties and have been shown to be soft and scratch resistant.

The polymeric materials used to make the flexible transparent cover sheet in preferred embodiments of this invention preferably have a light transmission greater than 92%. A polymeric material having an elastic modulus greater than 500 MPa is suitable. An elastic modulus greater than 500 MPa allows for the integral compressible spacer dots to withstand the compressive forces common to touch screens. Further, an elastic modulus greater than 500 MPa allows for efficient assembly of a touch screen as the dots are tough and scratch resistant.

A spacer dot integral to the flexible cover sheet significantly reduces unwanted reflection from an optical surface such as those present in prior art touch screens that utilize polymer beads. An integral spacer dot also provides for superior durability as the dot location is fixed in the flexible cover sheet of the invention and is not subject to movement during vibration or extended use. The integral compressible spacer dots of the invention preferably have heights between 2 and 100 micrometers, more preferably between 2 and 50 micrometers, and most preferably between 10 and 50 micrometers, although shorter or taller spacer dots might be desired in some applications. The height of the spacer dot should put enough distance between the top of the spacer dot and the conductive coating on the substrate so that inadvertent electrical contact between conductive coating on the substrate and the conductive coating on the flexible sheet can be avoided, at least when no touch is applied to the touch screen. In particular, the height should be at least somewhat greater than the size of possible asperities or other defects in the conductive coating(s) that could potentially bridge the gap if the spacer dots were not tall enough. In general, larger height of the spacer dots means a lower probability of inadvertent electrical contact and a higher actuation force. A height less than 10 micrometers, and in particular less than 2 micrometers, may not provide sufficient spacing for the two conductive layers resulting in false actuation. A height greater than 50 micrometers, and in particular greater than 100 micrometers, separating the layers may require too high a compression force to connect the two conductive layers and thus may be problematic.

A desired maximum diameter for the spacer dots generally depends on their heights, so that the ratio of height to diameter is often the relevant quantity, although the absolute value of the diameter may also be important. Dots having a smaller diameter may be less visible to a user. Dots having a smaller diameter may also lead to better electronic performance of the touch panel due to less total area coverage of the spacer dots. Very large dots may decrease touch screen resolution and/or increase the activation force. In illustrative cases, spacer dot maximum diameters may be in the range of 1 to 60 micrometers, although smaller or larger spacer dots might be desired in some applications. The spacer dots preferably have average height to maximum width ratios of between 0.5 and 2.5. It has been found that this range of aspect ratios enables long lasting touch screen spacer dots.

Figure 7:
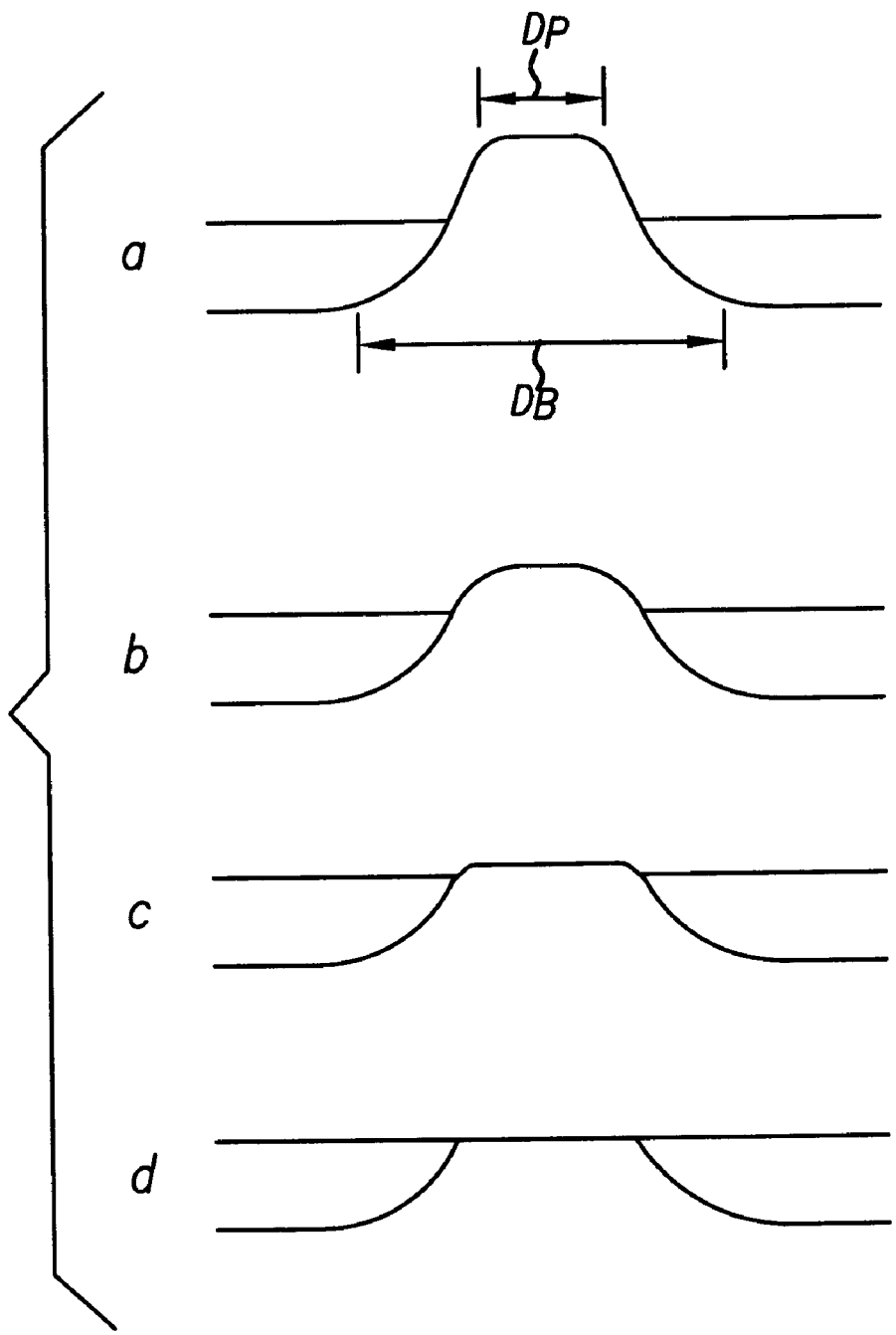
FIG. 7 is a diagram illustrating the compression of one of the spacer dots according to the present invention.

Referring to FIG. 7, the profile of a truncated conical spacer dot with a base diameter $D_b$ that is 75% larger than the peak diameter $D_p$ has been shown to provide an excellent compression profile allowing moderate levels of compressive force applied by the user to activate the touch screen. The base diameter being 75% larger than the peak diameter provides mechanical toughness, reduces dot wear and provides for over 1 million actuations before a 5% loss in height. A suitable material for the compressive dot illustrated in FIG. 7 is a blend of polyester and polycarbonate where the polycarbonate is present in the amount of 10% by weight of the polyester.

The size, shape, height, locations and spacing of compressible spacer dots can be chosen to meet the pressure and reliability usage specification of a particular application. In accordance with the invention, the integral compressible spacer dots are sized and positioned in a pattern that establishes at least one of differentiated minimum required activation forces and differentiated durability for selected areas of the touch screen. Such area specific differentiated performance criteria may be further combined singly, or in combination, with patterns that also establish differentiated accuracy for selected areas of the touch screen.

Having the spacer dots vary in shape and/or spacing pattern enables creation of touch screens that have varying levels of sensitivity, accuracy, and durability across the touch screen to tailor selected areas of the touch screen to their application. For example, the profile of the integral spacer dot embossing can vary to complement a variety of flexible cover sheet materials so as to maximize the lifetime, clarity, and physical properties of the flexible cover sheet.

The integral compressible spacer dots preferably are spaced apart by variable distances of between 0.25 and 25 millimeters, more preferably greater than 1 millimeter. Spacing less than 0.2 millimeter may require compressive forces that are too high to achieve contact between the two conductive layers. The polymer and dot profile used for the flexible cover sheet with integral compressible spacer dots according to this invention preferably provide for elastic deformation of greater than 1 million actuations, more preferably greater than 4 million actuations. Elastic deformation is the mechanical property of the spacer dot to recover at least 95% of its original height after an actuation. High-quality touch screens are also required to have a consistent actuation force over the useful lifetime of the device. Spacer dot fatigue can result in increasing actuation forces over the lifetime of the device, resulting in scratching of the surface of the touch screen and user frustration.

In certain applications, it is desirable to have a section of the touch screen have a higher sensitivity than other parts of the display, giving this higher sensitivity area a lower minimum required activation force compared to the other parts of the touch screen. This sensitive area might be an input to handwriting or other fine or complex inputs. In the sensitive section, the spacer dots would typically be smaller in size or height, and may have a more compressible shape, such that the two conductive layers touch under less force. Alternatively, the spacer dots may be located further apart or no spacer dots may be placed in the high-sensitivity area at all.

In another embodiment, it may be desirable to have an area of the display have higher accuracy leading that area of the touch screen to have spacer dots with smaller spacing compared to other parts of the touch screen. Having a higher number of spacer dots per unit area may give better accuracy to exactly where the stylus or other object touched the screen.

In other embodiment, there may be areas of high durability in the touch screen. In these areas, the spacer dots are made of a robust, durable shape, and tend to be larger. This area may require higher amounts actuation force, but in an area of a touch screen that is used repeatedly (like the button areas on a ATM screen), the touch screen may last longer. The spacer dots may also be closer together.

Figure 9:
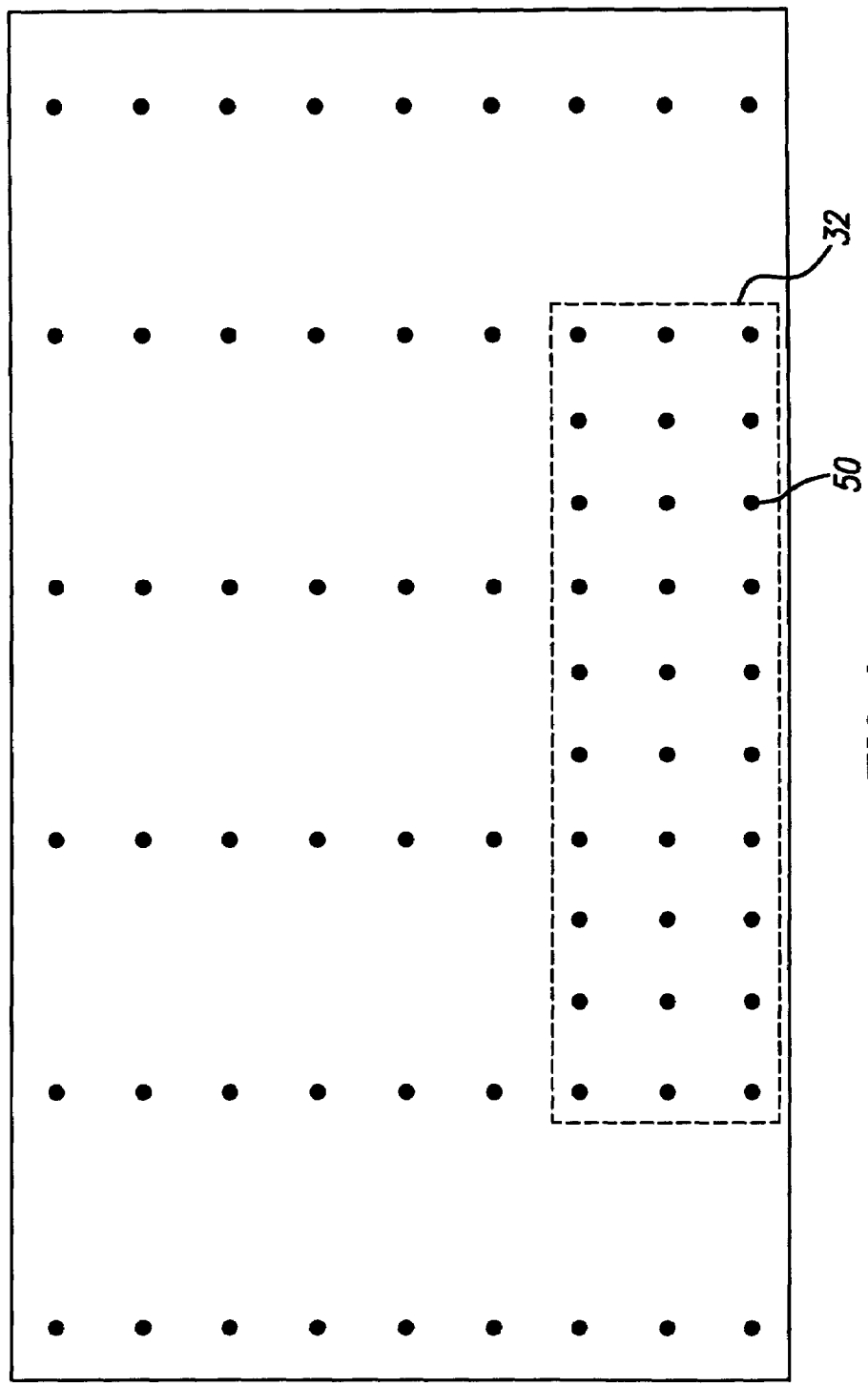
FIGS. 9–11 are schematic drawings of the flexible sheet with spacer dots, each illustrating one of the embodiments of the invention.
Figure 10:
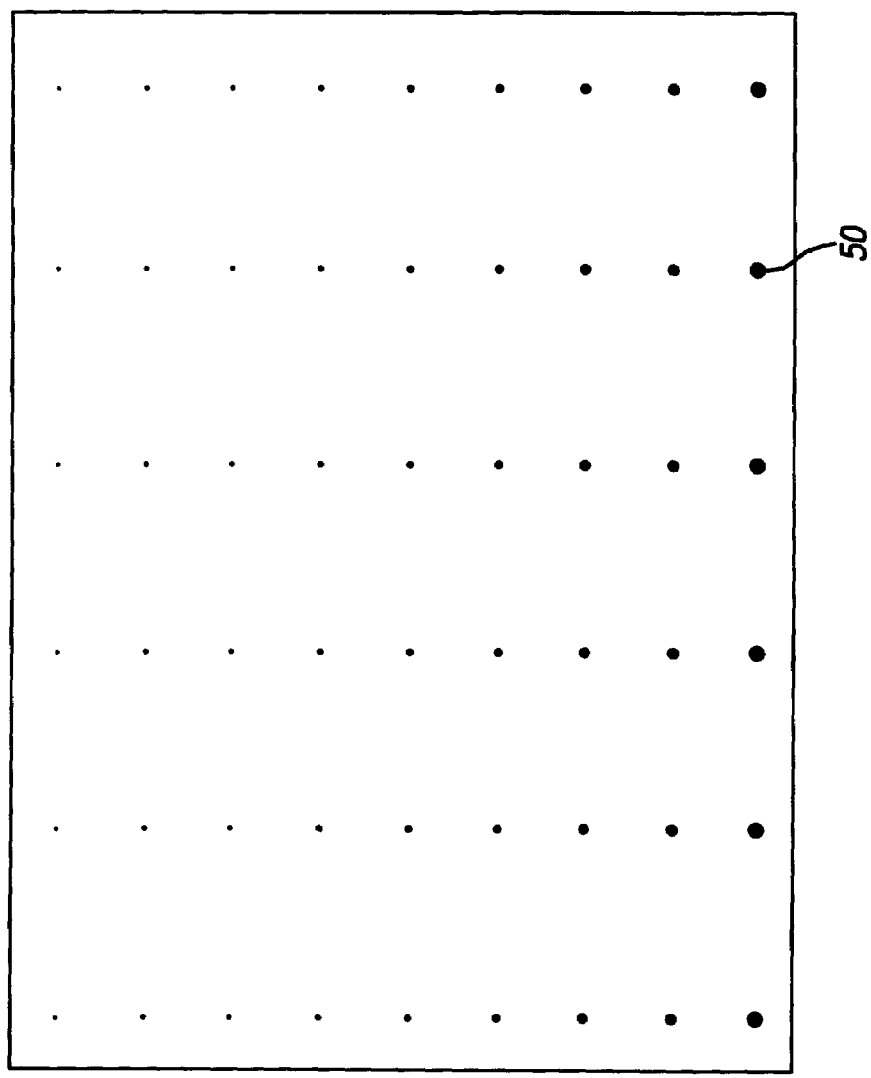
Figure 11:
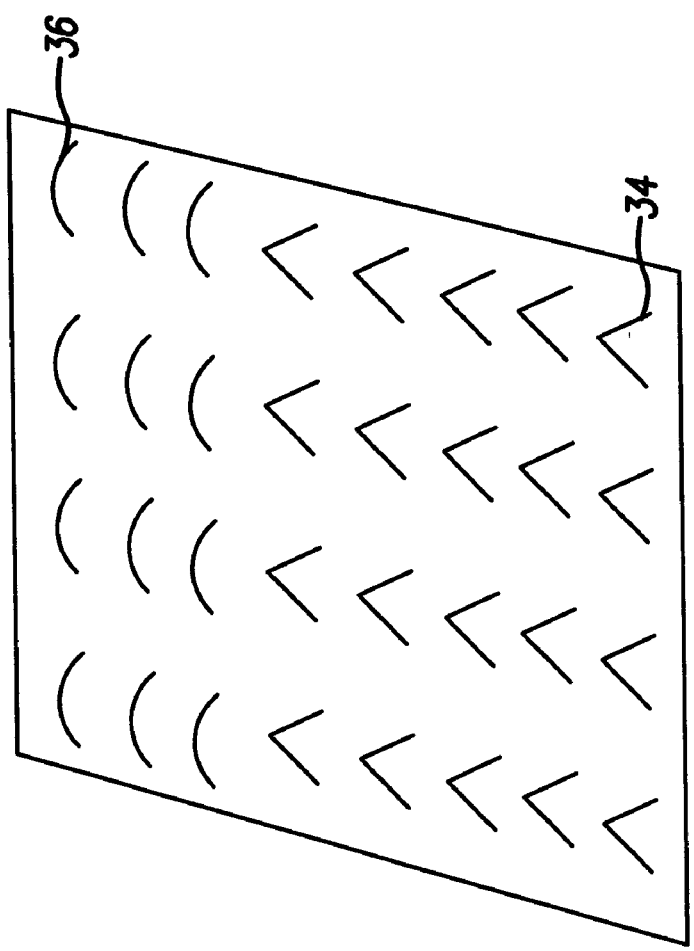

FIGS. 9–11 show illustrations of embodiments of the invention. FIG. 9 shows the flexible sheet of the touch screen (not to scale) with a section 32 of the touch screen having a closer spacing between spacer dots 50. FIG. 10 shows the flexible sheet of a touch screen (not to scale) having a gradient across the touch screen in both spacer dot 50 size and spacing. FIG. 11 shows the flexible sheet of a touch screen where the shape of the spacer dots varies across the display from pyramids 34 to hemispheres 36.

A touch screen wherein the spacer dot shape or spacing varies more than 10 percent in two different locations of the touch screen is preferred. Shape is defined as the physical dimensions of the spacer dot, including but not limited to height, diameter, aspect ratio, and geometry. Spacing is defined as the center to center distance between two adjacent spacer dots. A spacer dot that varies less than 3 percent in shape or spacing may not exhibit differential performance beyond that caused by variations in the touch screen caused by manufacturing process control variations. More preferably, the spacer dots vary more than 50 percent in shape or spacing in two different locations of the touch screen. It has been shown that over 50 percent variation in two different locations of the touch screen produces a touch screen device that can be more efficiently tailored to meet the needs of each area of the touch screen.

In one embodiment, the shape or spacing of the spacer dots in the touch screen may be changed gradually to form a gradient. Having a gradient allows for the smooth transition from one spacer dot geometry or spacing to another without having an abrupt change that may be undesirable for the operation of the touch screen. The shape or spacing can change by the following mathematical variations, for example, where "distance" is defined as location relative to a defined reference point:

Shape or spacing=$e^{1/distance}$ or $e^{-1/distance}$
Shape or spacing=1/distance or –1/distance
Shape or spacing=distance*x or –distance*x
(where x is a real number)

Each specific spacer dot configuration determines the amount of variation needed and the rate at which the shape or spacing changes with respect to distance on the touch screen. For some applications, the spacer dots may vary across the width or height of the touch screen. In others, the variation may be from the center of the touch screen to the outer perimeter, or around the perimeter. The variation may also be a repeating pattern on the touch screen.

To further improve the utility and performance of the flexible cover sheet with integral compressible spacer dots, the addition of layered inorganic particulates can be added to the polymeric material. The addition of layered organic particulates can provide a significant improvement in the elastic deformation of the polymer spacer dots. Further, the addition of inorganic layered particulates can be used to increase the Tg of the polymer spacer dots allowing for a wider performance range with respect to temperature. To obtain the elastic deformation and Tg improvements, the polymer may be provided with between 1 and 5% weight addition of an inorganic layered particle having an aspect ratio of at least 10 to 1, a lateral dimension of between 0.01 μm and 5 μm, and a vertical dimension between 0.5 nm and 10 nm.

The layered particle materials suitable for this invention can comprise any inorganic layered materials in the shape of plates with significantly high aspect ratio. As used herein, "plate" means a three dimensional shape having two dimensions of the same size scale and a third dimension having a substantially smaller scale. For example, the length and width of a plate are of comparable size but orders of magnitude greater than the thickness of the plate.

However, other shapes with high aspect ratio will also be advantageous, as per the invention. The layered materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers maybe useful provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\text{-}2H_2O$, $CaPO_4CH_3\text{—}H_2O$, $MnHAsO_4\text{—}H_2O$, $Ag_6Mo_{10}O_{33}$ and the like.

Suitable layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in clay literature (see, for example, the textbook: "An introduction to clay colloid chemistry," by H. van Olphen, John Wiley & Sons Publishers). Typical phyllosilicates with ion exchange capacity of 50 to 300 milliequivalents per 100 grams are suitable. Suitable layered materials for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Suitable smectite clays include montmorillonite, hectorite and hydrotalcites, because of commercial availability of these materials.

The aforementioned smectite clay can be natural or synthetic. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the smectite clay particles should have a lateral dimension of between 0.01 μm and 5 μm, and preferably between 0.05 μm and 2 μm, and more preferably between 0.1 μm and 1 μm. The thickness or the vertical dimension of the clay particles can vary between 0.5 nm and 10 nm, and preferably between 1 nm and 5 nm. The aspect ratio, which is the ratio of the largest and smallest dimension of the clay particles should be between 10:1 and 1000:1 for this invention. The aforementioned limits regarding the size and shape of the particles are to ensure adequate improvements in some properties of the nanocomposites without deleteriously affecting others.

"Nanocomposite" shall mean a composite material wherein at least one component comprises an inorganic phase, such as a smectite clay, with at least one dimension in the 0.1 to 100 nanometer range. For example, a large lateral dimension may result in an increase in the aspect ratio, a desirable criterion for improvement in mechanical and barrier properties. However, very large particles can cause optical defects due to deleterious light scattering, and can be abrasive to processing, conveyance and finishing equipment as well as to other components.

The concentration of smectite clay in the polymer material can vary as per need; however, it is preferred to be ≦10% by weight of the binder. Significantly higher amounts of clay can impair physical properties of the optical component by rendering it brittle, as well as difficult to process. On the other hand, too low a concentration of clay may fail to achieve the desired optical effect. The clay concentration may be maintained between 1 and 10% and preferably be between 1.5 and 5% for optimum results.

The smectite clay materials, generally require treatment by one or more intercalants to provide the required interlayer swelling and/or compatibility with the matrix polymer. The resulting interlayer spacing is critical to the performance of the intercalated layered material in the practice of this invention. As used herein the "inter-layer spacing" refers to the distance between the faces of the layers as they are assembled in the intercalated material before any delamination (or exfoliation) takes place. The clay materials generally include interlayer or exchangeable cations such as Na+, Ca+2, K+, Mg+2 and the like. In this state, these materials do not delaminate in host polymer melts regardless of mixing, because their interlayer spacings are usually very small (typically equal to or less than about 0.4 nm) and consequently the interlayer cohesive energy is relatively strong. Moreover, the metal cations do not aid compatibility between layers and the polymer melt.

In the present invention, the smectite clays are preferably intercalated by swelling agent(s) or intercalant(s), to increase interlayer distances to the desired extent. In general, the interlayer distance should be at least about 0.5 nm, preferably at least 2 nm, as determined by X-ray diffraction. The clay to swelling agent or intercalant weight ratio may vary from 0.1:99.9 and 99.9:01, but preferably between 1:99 and 90:10 and more preferably between 20:80 and 80:20.

"Intercalant" shall mean the aforesaid foreign molecule inserted between platelets of the aforesaid layered material. "Exfoliation" or "delamination" shall mean separation of individual platelets in to a disordered structure without any stacking order. "Intercalated" shall refer to layered material that has at least partially undergone intercalation and/or exfoliation. "Organoclay" shall mean clay material modified by organic molecules.

The swelling agent or intercalant can be an organic material preferably comprising a hydrophilic component, and more preferably also comprising an oleophilic component. It is believed that the hydrophilic component participates in intercalation and the oleophilic component participates in compatibilization of the smectite clay in a suitable matrix or binder polymer. The aforesaid organic material can comprise a surfactant, a block co-polymer and/or an ethoxylated alcohol. In one embodiment, the aforesaid organic material is a block copolymer or an ethoxylated alcohol, similar to those disclosed in U.S. Pat. Nos. 4,739,007; 4,810,734; 4,894,411; 5;102,948; 5,164,440; 5,164,460; 5,248,720; 5,854,326; and 6,034,163 incorporated herein by reference. "Layered material" shall mean an inorganic material such as a smectite clay that is in the form of a plurality of adjacent bound layers. "Platelets" shall mean individual layers of the layered material. "Intercalation" shall mean the insertion of one or more foreign molecules or parts of foreign molecules between platelets of the layered material, usually detected by X-ray diffraction technique, as illustrated in U.S. Pat. No. 5,891,611 (line 10, col. 5–line 23, col. 7).

The block copolymers are amphiphilic and have a hydrophilic and an oleophilic component. Further, the block copolymers can be of the two block or "A-B" type where A represents the hydrophilic component and B represents the oleophilic component or of the three block or "A-B-A" type. For example, the block copolymer may comprise three blocks and the matrix may comprise a copolymer or a blend of polymers compatible with at least one block of the copolymer. Also, where the matrix is a blend of polymers, individual polymers in the blend may be compatible with separate blocks of the copolymers. One class of polymeric components that is useful for the hydrophilic component is poly(alkylene oxides) such as poly(ethylene oxide). The term poly(alkylene oxides) as used herein includes polymers derived from alkylene oxides such as poly(ethylene oxides) including mixtures of ethylene and propylene oxides. The most suitable is poly(ethylene oxide), because of its effectiveness in the present invention, its well-known ability to intercalate clay lattices through hydrogen bonding and ionic interactions, as well as its thermal processability and lubricity. The term poly(alkylene oxides) as used herein includes polymers derived from alkylene oxides such as poly(ethylene oxides) including mixtures of ethylene and propylene oxides. The most suitable is poly(ethylene oxide), mainly because of its effectiveness, its commercial availability in a range of molecular weights and chemistries affording a wide latitude in the synthesis of the block copolymers.

Poly(ethylene oxides) are well known in the art and are described in, for example U.S. Pat. No. 3,312,753 at col. 4. Useful (alkylene oxide) block contains a series of interconnected ethyleneoxy units and can be represented by the formula:

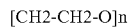

wherein the oxy group of one unit is connected to an ethylene group of an adjacent ethylene oxide group of an adjacent ethyleneoxy unit of the series.

Other useful hydrophilic components include poly 6, (2-ethyloxazolines), poly(ethyleneimine), poly(vinylpyrrolidone), poly(vinyl alcohol), polyacrylamides, polyacrylonitrile, polysaccharides and dextrans.

The oleophilic component of the block of the polymers useful in the present invention can also be selected from many common components. The oleophilic component is characterized in that it is at least partially miscible in the binder polymer, and/or interacts with the binder polymer, for example, through transesterfication. In the case of a polyester binder, the oleophilic block comprises polyester. Exemplary oleophilic components can be derived from monomers in such as: caprolactone; propiolactone; β-butyrolactone; δ-valerolactone; ε-caprolactam; lactic acid; glycolic acid; hydroxybutyric acid; derivatives of lysine; and derivatives of glutamic acid.

Other useful oleophilic components can be derived from α, β-ethylenically unsaturated monomers, such as olefins, styrenics and acrylates. Polymeric forms would include polycaprolactone; polypropiolactone; poly β-butyrolactone; poly δ-valerolactone; poly ε-caprolactam; polylactic acid; polyglycolic acid; polyhydroxybutyric acid; derivatives of polylysine; and derivatives of polyglutamic acid, polyolefins, polystyrene, polyacrylates, and polymers of α, β-ethylenically unsaturated monomers, such as olefins, styrenics and acrylates. Suitable components comprise polyester, polycaprolactone, polyamide, and polystyrene, because of their effectiveness in the present invention and compatibility with a wide rage of engineering thermoplastics.

The molecular weights of the hydrophilic component and the oleophilic component are not critical. A useful range for the molecular weight of the hydrophilic component is between about 300 and 50,000 and preferably 1,000 and 25,000. The molecular weight of the oleophilic component is between about 1,000 and 100,000 and preferably between 2,000 and 50,000. A matrix compatible block comprises 50 to 500 monomer repeat units of caprolactone with a matrix polymer of polyester. Another matrix compatible block comprises 25 to 100 monomer repeat units of ethylene with a matrix polymer of polyethylene. The molecular weight ranges are chosen to ensure ease of synthesis and processing under a variety of conditions.

Ethoxylated alcohols are a class of nonionic surfactants derived from very long chain, linear, synthetic alcohols. These alcohols are produced as functional derivatives of low molecular weight ethylene homopolymers. These when reacted with ethylene oxide or propylene oxide yield condensation products known as oxylated alcohols. The average chain length of the hydrocarbon portion can be between 12 and 106 carbons but is not restricted to this. It is preferably in the 26–50 carbon range.

The relative efficiency of the hydrophilic and oleophilic portion of the ethoxylated alcohol molecule is controlled by changing the starting alcohol, changing the amount of ethylene oxide, or using propylene oxide. The ethylene oxide or propylene oxide content can range from 1 to 99% by weight, preferably 10–90% by weight. Thus the surfactant chemistry can be widely tailored for use in a wide range of applications. Typically they have been used as dispersion aids for pigments in paints, coatings and inks. They have been used as mold release components for plastics, nonionic emulsifiers, emulsifiers/lubricants for textile processing and finishing. The present invention finds that oxylated alcohols, especially ethoxylated alcohols, may be used for intercalation of smectite clays. These intercalated clays are easily dispersed in commercial polyolefin polymers and the degree of intercalation produced by the ethoxylated alcohols was not found to be reduced after dispersion.

The smectite clay and the intercalant, preferably the block copolymer and/or the ethoxylated alcohol, can be interacted for intercalation by any suitable means known in the art of making nanocomposites. For example, the clay can be dispersed in suitable monomers or oligomers, which are subsequently polymerized. Alternatively, the clay can be melt blended with the block copolymer, oligomer or mixtures thereof at temperatures preferably comparable to their melting point or above, and sheared. In another method, the clay and the block copolymer can be combined in a solvent phase to achieve intercalation, followed by solvent removal through drying.

Figure 8:
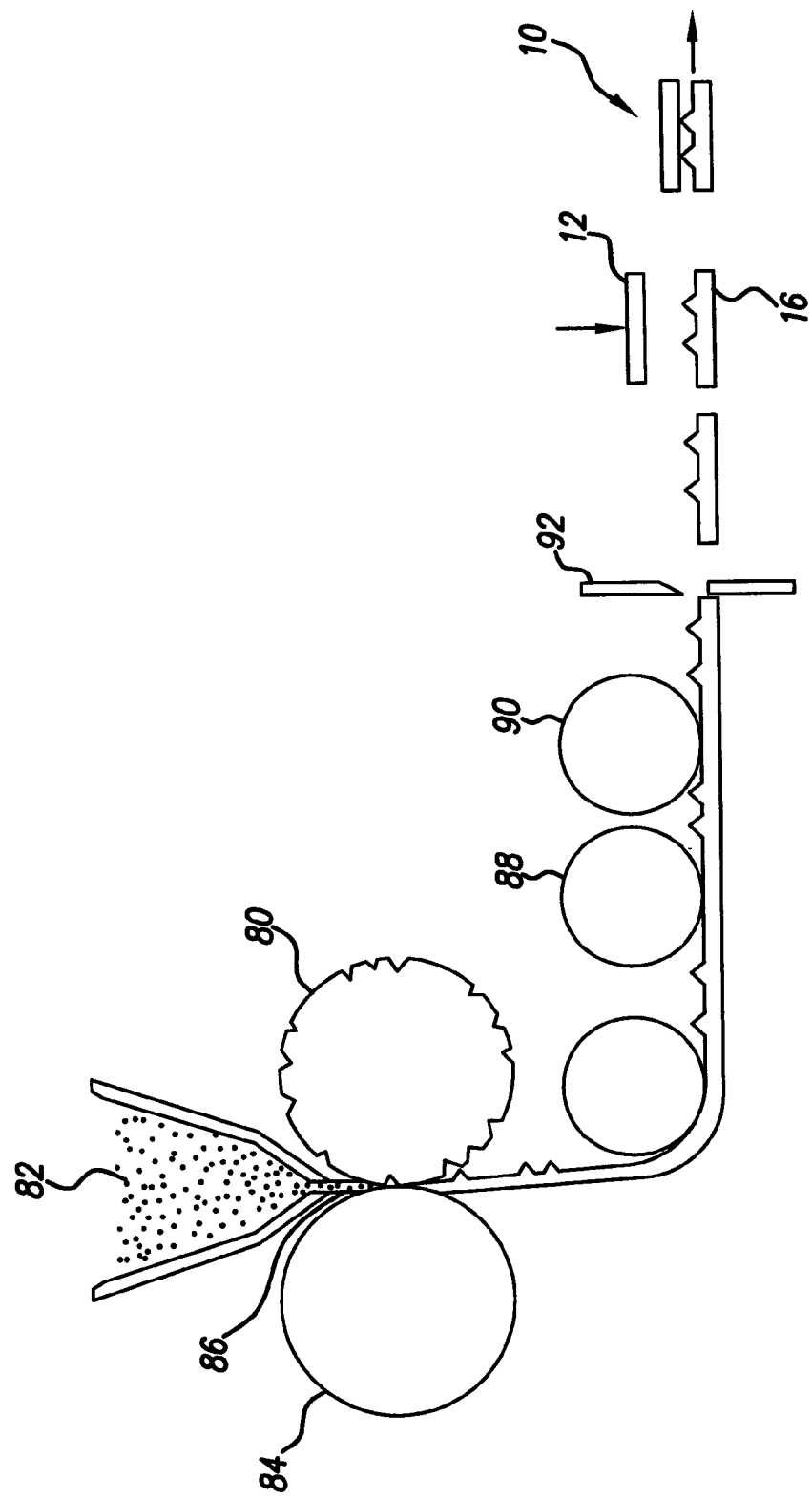
FIG. 8 is a schematic diagram illustrating one method of making a touch screen according to the present invention.

Referring to FIG. 8, in a preferred embodiment of the present invention, the integral spacer dots and flexible cover sheet are injection roll molded as a single unit. In the injection roll molding process a polymer 82 is heated above its melting point, and is injected under pressure into a nip 86 formed by a patterned roller 80 and an elastomer covered backing roller 84 in direct contact with the patterned roller 80. The patterned roller 80 has a pattern of cavities for forming the integral spacer dots. As the polymer is injected into the nip 86, some of the melted polymer fills the cavities of the patterned roller to form the integral spacer dots and the balance of the polymer is squeezed into a flat sheet having the integral spacer dots. After the integral spacer dots and flexible cover sheet have been formed, the flexible cover sheets with integral spacer dots are mechanically released from both of the rollers.

The tool, which can be a pattern roller 80 or a flat form, typically metal, used in a manufacturing process to form the flexible polymeric cover sheet with integral spacer dots, may be created by different methods. Methods are selected based on tool size desired and polymer replication manufacturing method employed. To create a spacer dot, corresponding depressions in the tooling may be made. The methods described below, e.g., may be combined or used in series to achieve the desired structure. In one embodiment, micro chemical machining was used. This approach utilized patterning photo resist as a means to make a master tool. A series of layers of photoresist were etched to create the spacer dots utilizing various etching processes such as chemical etch or other isotropic or anisotropic etches. In another embodiment, a method of micro drilling blind holes with a spade drill on a micro milling system could be used to create the spacer dots. Some other methods that could be used to create the desired features are a static indentation process with an indenting tool or a micro EDM system shaped electrode with the required size used to create the array of spacer dots. Electromechanical engraving and fast-tool servo processes which may be used to form a patterned roller for use in the present invention are also described in copending, commonly assigned U.S. Ser. No. 10/987,467, the disclosure of which is hereby incorporated by reference.

A conductive layer is then applied 90 on the substantially planar surface of the flexible cover sheet, such that the conductive coating preferably does not coat or deposit into the peaks of the spacer dots. A low viscosity conductive material may be efficiently flowed into the spaces between the spacer dots, leaving the peaks exposed. The conductive material viscosity in such embodiment is preferably less than 4 mPa.sec. Conductive material coated on the peaks of the spacer dots may be scraped off. In a further embodiment, the peaks of the spacer dots and/or the area between the spacer dots may be treated 88 with a high energy treatment such as CDT (corona discharge treatment) or GDT (glow discharge treatment) to provide a surface energy difference between the peaks of the spacer dots and the space between the spacer dots allowing for differential conductive solution wetting between the peaks of the spacer dots and the space between the spacer dots. The peaks may be treated by CDT or GDT by directing the high energy perpendicular to the surface of the peaks as is typical with CDT or GDT surface treatment. Further, the CDT or GDT treatment may be directed at the spacer dots at an angle greater than 15 degrees from the perpendicular case that also allows for differential energy treatment of the spacer dots. A conductive coating solution may then be applied 90 to the flexible cover sheet such that the conductive coating flows off of the peaks of the dots and into the spaces between the dots, leaving the peaks of the spacer dots free of conductive coating. Alternatively, or additionally, the spacer dots may comprise undercuts as described in copending, commonly assigned U.S. Ser. No. 10/988,234 or channels may be formed in the flexible cover sheet surrounding the spacer dots as described in copending, commonly assigned U.S. Ser. No. 10/986,969, the disclosures of which are hereby incorporated by reference, such that when the flexible sheet has a conductive layer deposited on it, the spacer dot undercut or surrounding channel will remain uncoated and form an electrical discontinuity between the top of the spacer dot and the flexible sheet. Suitable coating methods including curtain coating, roll coating and spin coating, slide coating, ink jet printing, patterned gravure coating, blade coating, electro-photographic coating and centrifugal coating, sputtering, and vapor deposition may be used to apply the conductive coating. The coating is then dried or cured to form the conductive layer. The conductive coating may have a sheet resistivity of between 100 and 600 ohms/square. The sheet resistivity may be varied by adjusting the thickness of deposition.

In preferred embodiments, the conductive layer is transparent, and may be formed, e.g., from materials which include indium tin oxide, antimony tin oxide, electrically conductive polymers such as substituted or unsubstituted polythiophenes, substituted or unsubstituted polypyrroles, single-wall carbon nanotubes, and substituted or unsubstituted polyanilines. Preferred electrically conducting polymers for the present invention include polypyrrole styrene sulfonate (referred to as polypyrrole/poly (styrene sulfonic acid) in U.S. Pat. No. 5,674,654), 3,4-dialkoxy substituted polypyrrole styrene sulfonate, and 3,4-dialkoxy substituted polythiophene styrene sulfonate. The most preferred substituted electronically conductive polymers include poly(3,4-ethylene dioxythiophene styrene sulfonate).

Finally, the web of flexible cover sheet material with integral spacer dots and conductive coating is cut 92 into individual cover sheets 16 and applied to a substrate 12 of a touch screen 10. Touch screens in accordance with the invention may be used in conjunction with any flat panel display or lamp, including but not limited to OLED and liquid crystal display devices. Accordingly, it is further contemplated that the flexible cover sheet may be cut into the desired size for application to an LCD or OLED flat-panel display or other OLED device.

Figure 5:
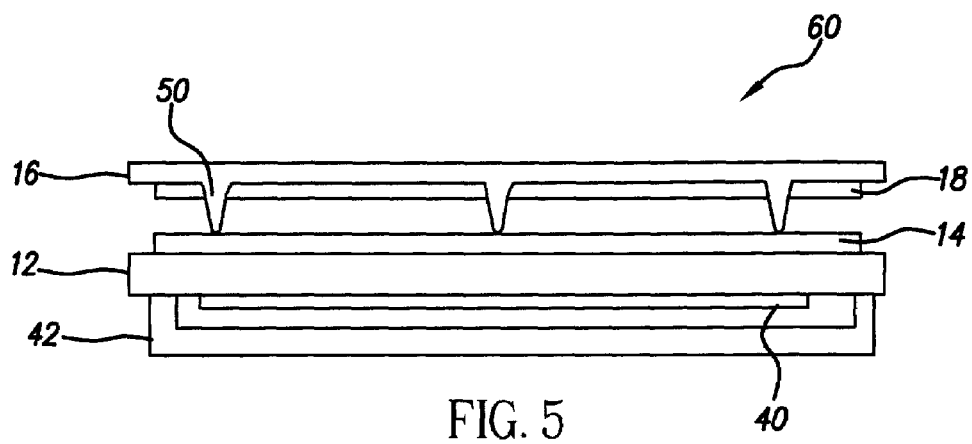
FIG. 5 is a side-view of a resistive touch screen of the present invention integrated with a bottom emitting flat-panel display.
Figure 6:
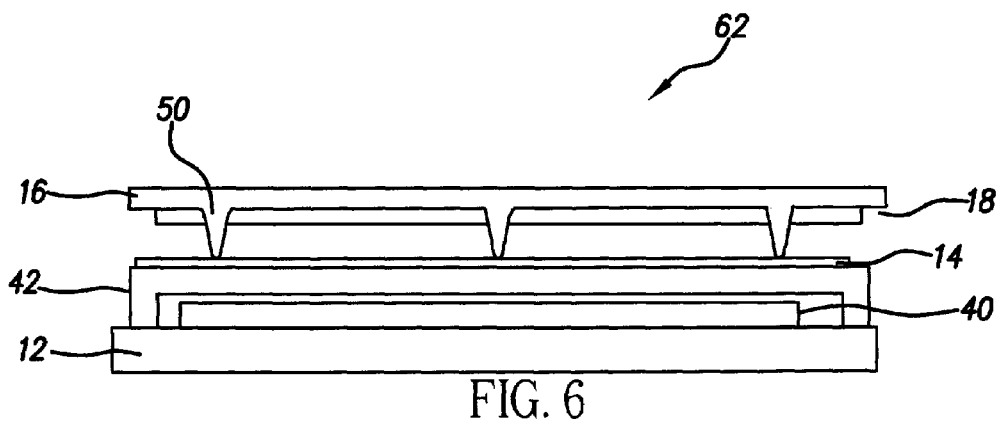
FIG. 6 is a side-view of a resistive touch screen of the present invention integrated with a top emitting flat-panel.

Referring to FIGS. 5 and 6, e.g., the touch screen of the present invention can be integrated into a flat-panel display by using either the cover or the substrate of the flat-panel display as the transparent substrate 12 of the touch 10 screen. The substrate may be rigid or flexible. The flat-panel display may emit light through a transparent cover or through a transparent substrate. As shown in FIG. 5, a flat-panel organic light emitting diode (OLED) display with an integrated touch screen 60 includes a substrate 12, OLED materials 40 and encapsulating cover 42 for the OLED display. On the opposite side of the substrate 12, the touch screen includes the first conductive layer 14 and the flexible transparent cover sheet 16 having a second conductive layer 18 and integral compressible spacer dots 50. The flat panel display device may also be a liquid crystal display device.

As shown in FIG. 6, an OLED display with an integrated touch screen 62 includes a substrate 12, OLED materials 40, and an encapsulating cover 42 for the OLED display. On the opposite side of the encapsulating cover 42, the touch screen includes the first conductive layer 14 and the flexible transparent cover sheet 16 having a second conductive layer 18 and integral compressible spacer dots 50. In both FIGS. 5 and 6, the cover or substrate of the OLED display may be flexible so that a completely integrated, flexible display and touch screen are realized. The flexible sheet may be provided with a pressure sensitive adhesive opposite the spacer dots to adhere the flexible sheet to a device.

Applicants have demonstrated the present invention through the construction of a 100-micrometer thick polycarbonate transparent flexible cover sheet having integral polycarbonate hemispherical spacer dots of varying size and spacing using injection roll molding to form a 20 cm by 20 cm sheet. The spacer dots at one corner were 5 micrometers in diameter and 2 millimeters apart and gradually grew in diameter and spacing, to 20 micrometers diameter and 5 millimeter spacing, in the corner diagonal to the first. The cover sheet containing the spacer dots was coated with a conductive polymer having a sheet resistivity of 375 ohms/square using a gravure coating process with a scraping blade contacting the spacer dots to yield a continuous conductive coating in the area not occupied by the integral spacer dots.

The spacer dot sizes and the pattern depths determine the number of features required in the roller per area to provide desired performance. Larger diameters and deeper patterns typically require fewer numbers of features in a given area. Therefore the spacer dot size and the pattern depth inherently determine the number of features. The spacer dots may also be manufactured by vacuum forming around a pattern, injection molding the dots and embossing dots in a polymer web. While these manufacturing techniques do yield acceptable dots, injection roll molding polymer onto a patterned roller allows for the flexible cover sheet with spacer dots of the invention to be formed into rolls thereby lowering the manufacturing cost. Injection roll molding has been shown to efficiently replicate the desired complex dot geometry in an efficient manner.

The entire contents of the patents and other publications referred to in this specification are incorporated herein by reference.

The invention has been described in detail with particular reference to certain preferred embodiments thereof, but it will be understood that variations and modifications can be effected within the spirit and scope of the invention. For example, although the invention has been described with reference to a touch screen wherein the touch is applied to the cover sheet, in the case where both the substrate and the cover sheet are flexible, the touch could be applied to the substrate.

PARTS LIST 10 resistive touch screen
12 substrate
13 finger
14 first conductive layer
16 cover sheet
18 second conductive layer
20 spacer dots
32 close-spaced dots section
34 pyramid-shaped spacer dots
36 hemisphere-shaped spacer dots
40 OLED materials
42 encapsulating cover
50 integral compressible spacer dots
60 OLED display with integrated touch screen
62 OLED display with integrated touch screen
80 patterned roller
82 polymer
84 backing roller
86 nip
88 treatment step
90 coating step
92 cut step

The invention claimed is:

1. A touch screen comprising:
a) a substrate;
b) a first conductive layer located on the substrate;
c) a flexible sheet comprising a substantially planar surface and integral compressible spacer dots formed thereon, each integral compressible spacer dot having a base closest to the substantially planar surface and a peak furthest from the substantially planar surface; and
d) a second conductive layer located on the substantially planar surface of the flexible sheet, the peaks of the integral compressible spacer dots extending beyond the second conductive layer located on the substantially planar surface;
wherein the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers, and further wherein the integral compressible spacer dots are sized and positioned in a pattern that establishes at least one of differentiated minimum required activation forces and differentiated durability for selected areas of the touch screen.

2. The touch screen of claim 1, wherein the integral compressible spacer dots are sized and positioned in a pattern that establishes differentiated minimum required activation forces for selected areas of the touch screen.

3. The touch screen of claim 1, wherein the integral compressible spacer dots are sized and positioned in a pattern that establishes differentiated durability for selected areas of the touch screen.

4. The touch screen of claim. 1, wherein the integral compressible spacer dots are sized and positioned in a pattern that establishes differentiated minimum required activation forces and differentiated durability for selected areas of the touch screen.

5. The touch screen of claim 1, further wherein the integral compressible spacer dots are sized and positioned in a pattern that establishes differentiated accuracy for selected areas of the touch screen.

6. The touch screen of claim 1, wherein the spacer dots have variable heights between 2 and 50 micrometers.

7. The touch screen of claim 1, wherein the spacer dots have a variable spacing of between 0.25 and 25 millimeters.

8. The touch screen of claim 1 wherein the spacer dots provide elastic deformation for greater than 1 million actuations.

9. The touch screen of claim 1 wherein the spacer dots have variable elastic deformation.

10. The touch screen of claim 9 wherein the touch screen contains at least one area of higher durability comprising spacer dots that provide elastic deformation for greater than 4 million actuations.

11. The touch screen of claim 1 wherein the spacer dots have variable shapes.

12. The touch screen of claim 1 wherein the touch screen contains at least one area of higher sensitivity comprising spacer dots with smaller heights than spacer dots in other areas of the touch screen.

13. The touch screen of claim 1 wherein the touch screen contains at least one area of higher accuracy comprising spacer dots with smaller spacing than spacer dots in other areas of the touch screen.

14. The touch screen of claim 1 wherein at least one of the shape or spacing of the spacer dots varies by more than 10 percent in two different locations of the touch screen.

15. The touch screen of claim 1 wherein at least one of the shape or spacing of the spacer dots varies by more than 50 percent in two different locations of the touch screen.

16. The touch screen of claim 1 wherein at least one of the shape or spacing of the spacer dots varies between different areas according to a gradient pattern.

17. The touch screen of claim 1 wherein at least one of the shape or spacing of the spacer dots varies along the width or height of the touch screen.

18. The touch screen of claim 1 wherein at least one of the shape or spacing of the spacer dots varies from the geometric center to the perimeter of the touch screen.

19. The touch screen of claim 1 wherein at lest one of the shape or spacing of the spacer dots varies along the perimeter of the touch screen.

20. The touch screen of claim 1 wherein at least one of the shape or spacing of the spacer dots varies according to a repeating pattern.

21. The touch screen of claim 1, wherein the substrate, first conductive layer, flexible cover sheet, and second conductive layer are transparent.

22. The touch screen of claim 1, wherein the flexible sheet comprises one of the group including: polymer, polyolefin polymer, polyester, polycarbonate, and a blend of polyester and polycarbonate.

23. The touch screen of claim 1, wherein the integral compressible spacer dots comprise cylinder-shaped dots, cube-shaped dots, pyramid-shaped dots, cone-shaped dots, or sphere-shaped dots.

24. The touch screen of claim 1, wherein said spacer dots and cover sheet have a % visible light transmission greater than 92%.

25. The touch screen of claim 1 wherein the spacer dots comprise polymer with between 1 and 5% weight addition of an inorganic particle having an aspect ratio of at least 10 to 1, a lateral dimension of between 0.01 μm and 5 μm, and a vertical dimension between 0.5 nm and 10 nm.

26. The touch screen of claim 1, wherein said flexible cover sheet is further provided with a pressure sensitive adhesive opposite said spacer dots.

27. The touch screen of claim 1, wherein the second conductive layer comprises an electrically conductive polymer.

28. The touch screen of claim 27, wherein the conductive polymer comprises one of the group including polypyrrole styrene sulfonate, 3,4-dialkoxy substituted polypyrrole styrene sulfonate, and 3,4-dialkoxy substituted polythiophene styrene sulfonate, poly(3,4-ethylene dioxythiophene styrene sulfonate.

29. The touch screen of claim 27, wherein the conductive polymer comprises polythiophine.

30. The touch screen claimed in claim 1 wherein the substrate is flexible.

31. The touch screen claimed in claim 1 wherein the substrate is rigid.

32. The touch screen of claim 1 wherein the touch screen substrate is a cover or substrate of a flat-panel display device.

33. The touch screen claimed in claim 32, wherein the flat-panel display device is an OLED display device.

34. The touch screen claimed in claim 32, wherein the flat-panel display device is a liquid crystal display device.

35. The touch screen of claim 1 wherein the touch screen substrate is a cover or substrate of a flat-panel lamp.

36. The touch screen claimed in claim 35, wherein the flat-panel lamp is an OLED lamp.

37. A method of making a resistive touch screen, comprising the steps of:
 a) providing a substrate;
 b) forming a first conductive layer on the substrate;
 c) providing a flexible cover sheet comprising a substantially planar surface and integral compressible spacer dots formed thereon, each integral compressible spacer dot having a base closest to the substantially planar surface and a peak furthest from the substantially planar surface;
 d) forming a second conductive layer on the substantially planar surface of the flexible cover sheet, where the peaks of the integral compressible spacer dots extend beyond the second conductive layer formed on the substantially planar surface; and
 e) locating the flexible cover sheet over the substrate such the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers,
 wherein the integral compressible spacer dots are sized and positioned in a pattern that establishes at least one of differentiated minimum required activation forces and differentiated durability for selected areas of the touch screen.

38. The method claimed in claim 37, wherein the flexible sheet is provided as a web in a continuous roll, the integral spacer dots are molded in the continuous roll in accordance with the pattern, and the sheet is cut from the roll.

39. The method claimed in claim 37, wherein the spacer dots are formed in the flexible sheet in accordance with the pattern by injection roll molding.

40. The method claimed in claim 37, wherein the spacer dots are formed in the flexible sheet in accordance with the pattern by applying heat and pressure to the flexible sheet by a mold including a reverse image of the spacer dots.

\* \* \* \* \*